(12) United States Patent
Tsujii

(10) Patent No.: US 11,792,867 B2
(45) Date of Patent: Oct. 17, 2023

(54) COMMUNICATION SYSTEM, COMMUNICATION APPARATUS, CONTROL METHOD THEREOF, AND STORAGE MEDIUM

(71) Applicant: Canon Kabushiki Kaisha, Tokyo (JP)

(72) Inventor: Hiroto Tsujii, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/381,401

(22) Filed: Jul. 21, 2021

(65) Prior Publication Data

US 2021/0352748 A1    Nov. 11, 2021

Related U.S. Application Data

(63) Continuation of application No. 16/787,441, filed on Feb. 11, 2020, now Pat. No. 11,102,830, which is a
(Continued)

(30) Foreign Application Priority Data

Jun. 5, 2014   (JP) .................... 2014-117093

(51) Int. Cl.
*H04W 76/00*     (2018.01)
*H04B 5/00*      (2006.01)
(Continued)

(52) U.S. Cl.
CPC ............. *H04W 76/14* (2018.02); *H04W 4/80* (2018.02); *H04W 76/16* (2018.02); *H04W 84/12* (2013.01); *H04W 84/18* (2013.01); *H04W 88/06* (2013.01)

(58) Field of Classification Search
CPC ....... H04W 76/14; H04W 4/80; H04W 76/16; H04W 84/12; H04W 84/18; H04W 88/06;
(Continued)

(56) References Cited

U.S. PATENT DOCUMENTS 9,135,529 B2   9/2015  Okuno
9,164,711 B2  10/2015  Mori
(Continued)

FOREIGN PATENT DOCUMENTS

JP    2004-364145 A   12/2004
JP    2008160809 A    7/2008
(Continued)

OTHER PUBLICATIONS

Japanese Office Action issued in corresponding Japanese Application No. 2014117093 dated Jan. 26, 2018.
(Continued)

*Primary Examiner* — Andrew Wendell
(74) *Attorney, Agent, or Firm* — Venable LLP

(57) ABSTRACT

A mobile terminal (communication apparatus) selects a data item that needs to be obtained from an MFP (information processing apparatus) according to a user instruction given via an operation screen. Upon establishment of NFC communication between the mobile terminal and an NFC tag of the MFP as a result of the mobile terminal being brought closer to the NFC tag by the user, the mobile terminal reads, from the NFC tag, connection information for connecting to the MFP by using the Wi-Fi Direct. The mobile terminal connects to the MFP by using the Wi-Fi Direct based on the obtained connection information, and obtains data corresponding to the selected data item from the MFP through the Wi-Fi Direct communication.

22 Claims, 12 Drawing Sheets

Related U.S. Application Data continuation of application No. 16/242,360, filed on Jan. 8, 2019, now Pat. No. 10,609,748, which is a continuation of application No. 15/799,145, filed on Oct. 31, 2017, now Pat. No. 10,212,745, which is a continuation of application No. 14/724,420, filed on May 28, 2015, now Pat. No. 9,844,084.

(51) Int. Cl.
| | | |
|---|---|---|
| *H04W 76/14* | (2018.01) | |
| *H04W 4/80* | (2018.01) | |
| *H04W 84/12* | (2009.01) | |
| *H04W 76/16* | (2018.01) | |
| *H04W 84/18* | (2009.01) | |
| *H04W 88/06* | (2009.01) | |

(58) Field of Classification Search
CPC .. H04W 72/1205; H04W 76/10; H04B 3/544; H04B 7/18558; H04B 5/0025
See application file for complete search history.

(56) References Cited

U.S. PATENT DOCUMENTS

| | | |
|---|---|---|
| 9,311,032 B2 | 4/2016 | Lee et al. |
| 9,665,809 B2 | 5/2017 | Nakayama |
| 9,844,084 B2 | 12/2017 | Tsujii |
| 11,102,830 B2 * | 8/2021 | Tsujii ................... H04W 76/14 |
| 2003/0103234 A1 | 6/2003 | Takabayashi et al. |
| 2006/0200564 A1 | 9/2006 | Watanabe et al. |
| 2010/0088609 A1 | 4/2010 | Kawana |
| 2012/0017126 A1 | 1/2012 | Yamano |
| 2013/0260818 A1 | 10/2013 | Suzuki et al. |
| 2014/0207682 A1 | 7/2014 | Wolfond et al. |
| 2014/0376049 A1 | 12/2014 | Von Stein |
| 2015/0156343 A1 | 6/2015 | Tsujii |
| 2015/0205549 A1 | 7/2015 | Miyata |
| 2015/0248265 A1 | 9/2015 | Kang et al. |
| 2017/0070951 A1 | 3/2017 | Takeuchi |

FOREIGN PATENT DOCUMENTS

| | | |
|---|---|---|
| JP | 2009044764 A | 2/2009 |
| JP | 2009-116874 A | 5/2009 |
| JP | 2013187571 A | 9/2013 |
| JP | 2013247657 A | 12/2013 |
| JP | 2014-050015 A | 3/2014 |
| JP | 2014-068303 A | 4/2014 |
| JP | 2014-072768 A | 4/2014 |
| JP | 2014-086985 A | 5/2014 |
| JP | 2014090238 A | 5/2014 |

OTHER PUBLICATIONS

Japanese Office Action issued in corresponding Japanese Application No. 2014117093 dated Sep. 3, 2018.
Japanese Office Action issued in corresponding Japanese Application No. 2018-215778 dated Aug. 16, 2019.

* cited by examiner

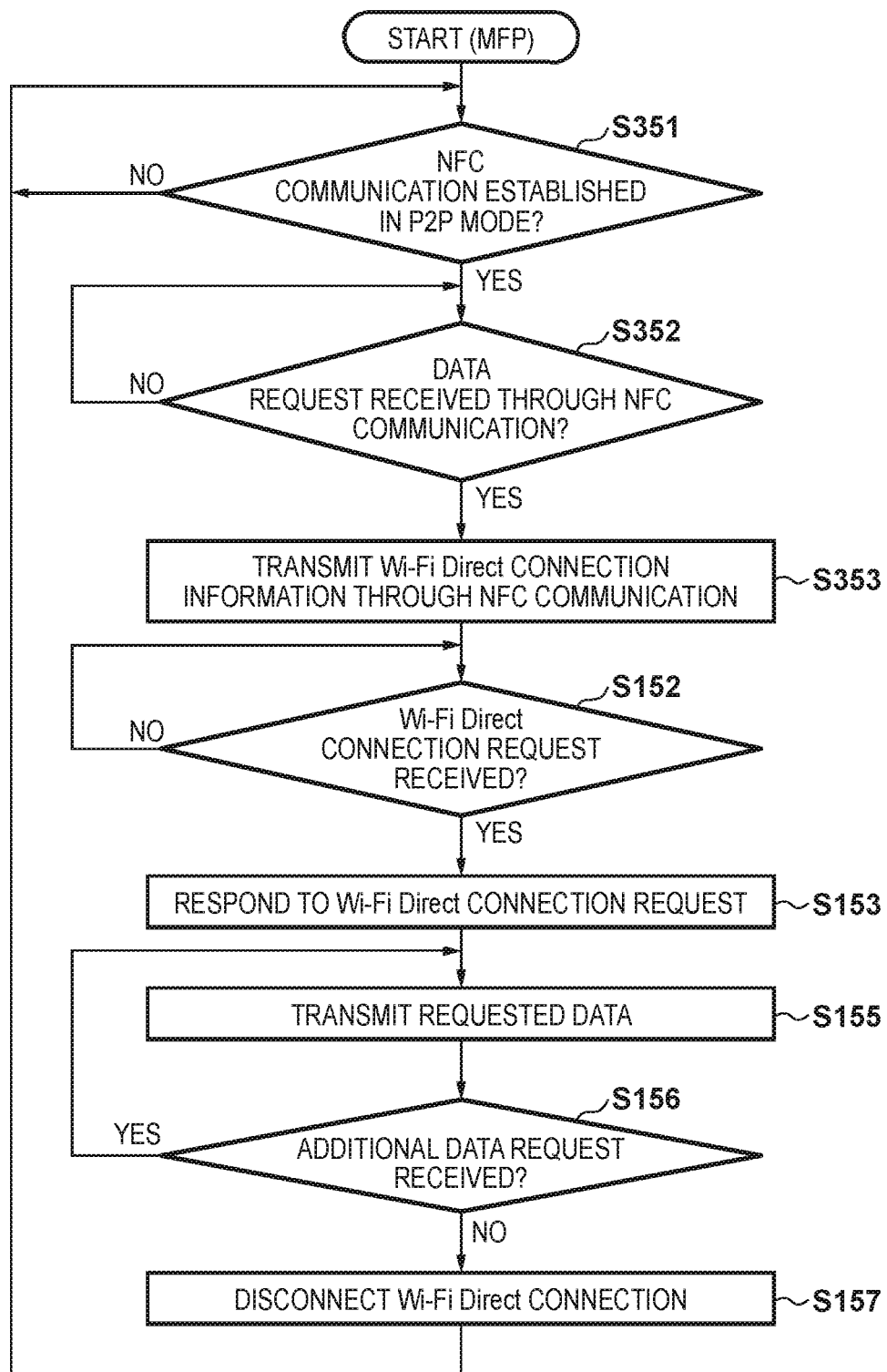

COMMUNICATION SYSTEM, COMMUNICATION APPARATUS, CONTROL METHOD THEREOF, AND STORAGE MEDIUM

CROSS-REFERENCE TO RELATED APPLICATIONS

The present application is a Continuation of U.S. patent application Ser. No. 16/787,441, filed Feb. 11, 2020, which is a Continuation of U.S. patent application Ser. No. 16/242,360, filed Jan. 8, 2019, and issued as U.S. Pat. No. 10,609,748 on Mar. 31, 2020, which is a Continuation of U.S. patent application Ser. No. 15/799,145, filed Oct. 31, 2017, and issued as U.S. Pat. No. 10,212,745 on Feb. 19, 2019, which is a Continuation of U.S. patent application Ser. No. 14/724,420, filed on May 28, 2015, and issued as U.S. Pat. No. 9,844,084 on Dec. 12, 2017, which claims the benefit of priority to Japanese Patent Application No. 2014-117093, filed Jun. 5, 2014, the entire disclosures of which are all hereby incorporated by reference herein.

BACKGROUND OF THE INVENTION

Field of the Invention

The present invention relates to a communication system, a communication apparatus, a control method thereof, and a storage medium.

Description of the Related Art

In recent years, products that implement a short-range wireless communication technique called "NFC" (Near Field Communication) and apply the NFC to pairing, authentication and the like so as to perform communication compliant with high-speed wireless communication standards such as Bluetooth® or Wi-Fi Direct® are available. Pairing refers to a communication procedure for transmitting and receiving apparatus information between apparatuses so as to establish a wireless connection therebetween. Such apparatuses can perform pairing therebetween through NFC communication, and perform the actual communication by a handover to communication compliant with the standards such as Bluetooth® or Wi-Fi Direct®. By simply bringing the NFC compliant apparatuses close to each other, the users can cause the apparatuses to automatically set complicated settings for establishing a wireless connection therebetween.

This technique has also recently started to be applied to information processing apparatuses such as multifunction peripherals and printers. For example, in an information processing apparatus, apparatus information (connection information) for establishing wireless communication including SSID, IP address, MAC address and the like is written in advance in an NFC tag. In this case, in response to a communication apparatus, such as a mobile terminal, that is compliant with the NFC being held by the user over the NFC tag of the information processing apparatus, pairing is performed between the information processing apparatus and the communication apparatus through NFC communication. Furthermore, a handover is performed from the NFC communication to communication compliant with the high-speed wireless communication standards such as Bluetooth® or Wi-Fi Direct®. Through this, the communication apparatus can transmit a job such as a print job or a scan job and receive data (scan data or the like) corresponding to the transmitted job through the high-speed wireless communication (see, for example, Japanese Patent Laid-Open No. 2004-364145).

Conventionally, the data that can be obtained by a communication apparatus such as a mobile terminal from an information processing apparatus such as a multifunction peripheral or a printer was limited to data (scan data or the like) supported by applications installed on the mobile terminal. However, in order to improve the convenience of users, it is necessary for users to, without any limitation to such data that are obtainable from the information processing apparatus, designate (select) data from among various types of data such as log information and settings information.

SUMMARY OF THE INVENTION

The present invention has been made in view of the problems described above. The present invention provides a technique for improving usability by enabling data designated by a user in a communication apparatus to be obtained from an information processing apparatus through high-speed wireless communication established based on short-range wireless communication.

According to one aspect of the present invention, there is provided a communication system comprising: an information processing apparatus; and a communication apparatus capable of communication with the information processing apparatus, wherein the information processing apparatus comprises: a first communication unit configured to perform communication using a first communication scheme for short-range wireless communication; and a second communication unit configured to perform communication using a second communication scheme for higher speed wireless communication than the first communication scheme, and the communication apparatus comprises: a designation unit configured to designate at least one data item that needs to be obtained from the information processing apparatus from among a plurality of data items in accordance with an instruction from a user; a first obtainment unit configured to obtain connection information for connecting to the information processing apparatus by using the second communication scheme from the information processing apparatus through the communication using the first communication scheme; and a second obtainment unit configured to connect to the information processing apparatus by using the second communication scheme based on the connection information obtained by the first obtainment unit, and obtain data corresponding to the data item designated by the designation unit from the information processing apparatus through the communication using the second communication scheme.

According to another aspect of the present invention, there is provided a communication apparatus capable of communication with an information processing apparatus, the communication apparatus comprising: a designation unit configured to designate at least one data item that needs to be obtained from the information processing apparatus from among a plurality of data items in accordance with an instruction from a user; a first obtainment unit configured to obtain connection information from the information processing apparatus by using a first communication scheme for short-range wireless communication, the connection information being information for connecting to the information processing apparatus by using a second communication scheme for higher speed wireless communication than the first communication scheme; and a second obtainment unit configured to connect to the information processing apparatus by using the second communication scheme based on the connection information obtained by the first obtainment unit and obtain data corresponding to the data item designated by the designation unit from the information processing apparatus through communication using the second communication scheme.

According to still another aspect of the present invention, there is provided a control method for controlling a communication apparatus capable of communication with an information processing apparatus, the method comprising: designating at least one data item that needs to be obtained from the information processing apparatus from among a plurality of data items in accordance with an instruction from a user; obtaining connection information from the information processing apparatus by using a first communication scheme for short-range wireless communication, the connection information being information for connecting to the information processing apparatus by using a second communication scheme for higher speed wireless communication than the first communication scheme; and connecting to the information processing apparatus by using the second communication scheme based on the obtained connection information so as to obtain data corresponding to the designated data item from the information processing apparatus through communication using the second communication scheme.

According to the present invention, it is possible to improve usability by enabling data designated by a user in a communication apparatus to be obtained from an information processing apparatus through high-speed wireless communication established based on short-range wireless communication.

Further features of the present invention will become apparent from the following description of exemplary embodiments (with reference to the attached drawings).

BRIEF DESCRIPTION OF THE DRAWINGS

FIG. 12 is a flowchart illustrating a procedure for performing control for obtaining data executed by an MFP 101 according to the third embodiment.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

A first embodiment will be described with reference to FIGS. 1 to 8. Note that FIGS. 1 to 6 and the description of these diagrams apply equally to first to third embodiments.

Configuration of Communication System

Figure 1:
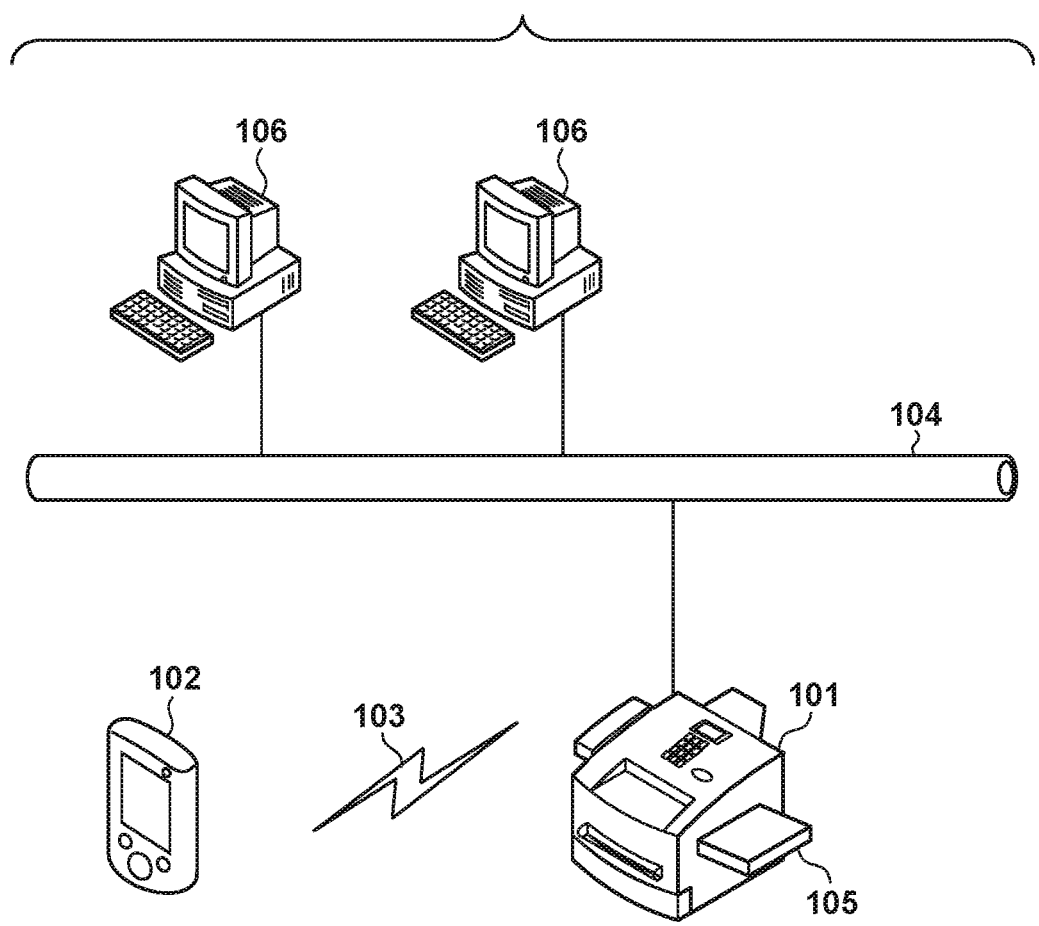
FIG. 1 is a diagram showing an example of a configuration of a communication system.

FIG. 1 is a diagram showing an example of a configuration of a communication system according to the first embodiment. In the communication system, an MFP 101 and personal computers (PC) 106 are connected via a wired local area network (LAN) 104, and the MFP 101 and a mobile terminal 102 are wirelessly connected via a wireless LAN (Wi-Fi Direct connection 103). The MFP 101 and the mobile terminal 102 may also be wirelessly connected by NFC. The MFP 101 is an example of an information processing apparatus, and the mobile terminal 102 is an example of a communication apparatus capable of communication with the information processing apparatus.

The MFP 101 and the mobile terminal 102 are compliant with the NFC as a communication scheme (first communication scheme) for short-range wireless communication. The MFP 101 and the mobile terminal 102 are further compliant with an IEEE 802.11 wireless LAN scheme and the Wi-Fi Direct, which is one of the communication schemes that use a wireless LAN scheme, as a communication scheme (second communication scheme) for higher speed wireless communication than the NFC.

As shown in FIG. 1, the MFP 101 includes an NFC tag 105 that is compliant with the NFC, and is capable of performing NFC communication with an external apparatus that is complaint with the NFC such as the mobile terminal 102 via the NFC tag 105. The MFP 101 is also capable of performing facsimile communication via a public network.

The mobile terminal 102 is capable of performing communication with the MFP 101 by connecting to an access point (not shown) on the wired LAN 104 by using a WLAN scheme. The mobile terminal 102 is further capable of performing direct communication with the MFP 101 by connecting to the MFP 101 by using the Wi-Fi Direct (Wi-Fi Direct connection 103) without connecting to any access point.

In the present embodiment, an example will be described in which the MFP 101 and the mobile terminal 102 perform direct communication using the NFC as short-range wireless communication, and further perform direct communication using the Wi-Fi Direct as high-speed wireless communication. However, the present embodiment is also applicable to the case where the MFP 101 and the mobile terminal 102 perform high-speed wireless communication via an access point (not shown) by using the WLAN scheme instead of using the Wi-Fi Direct.

Configuration of MFP

Figure 2:
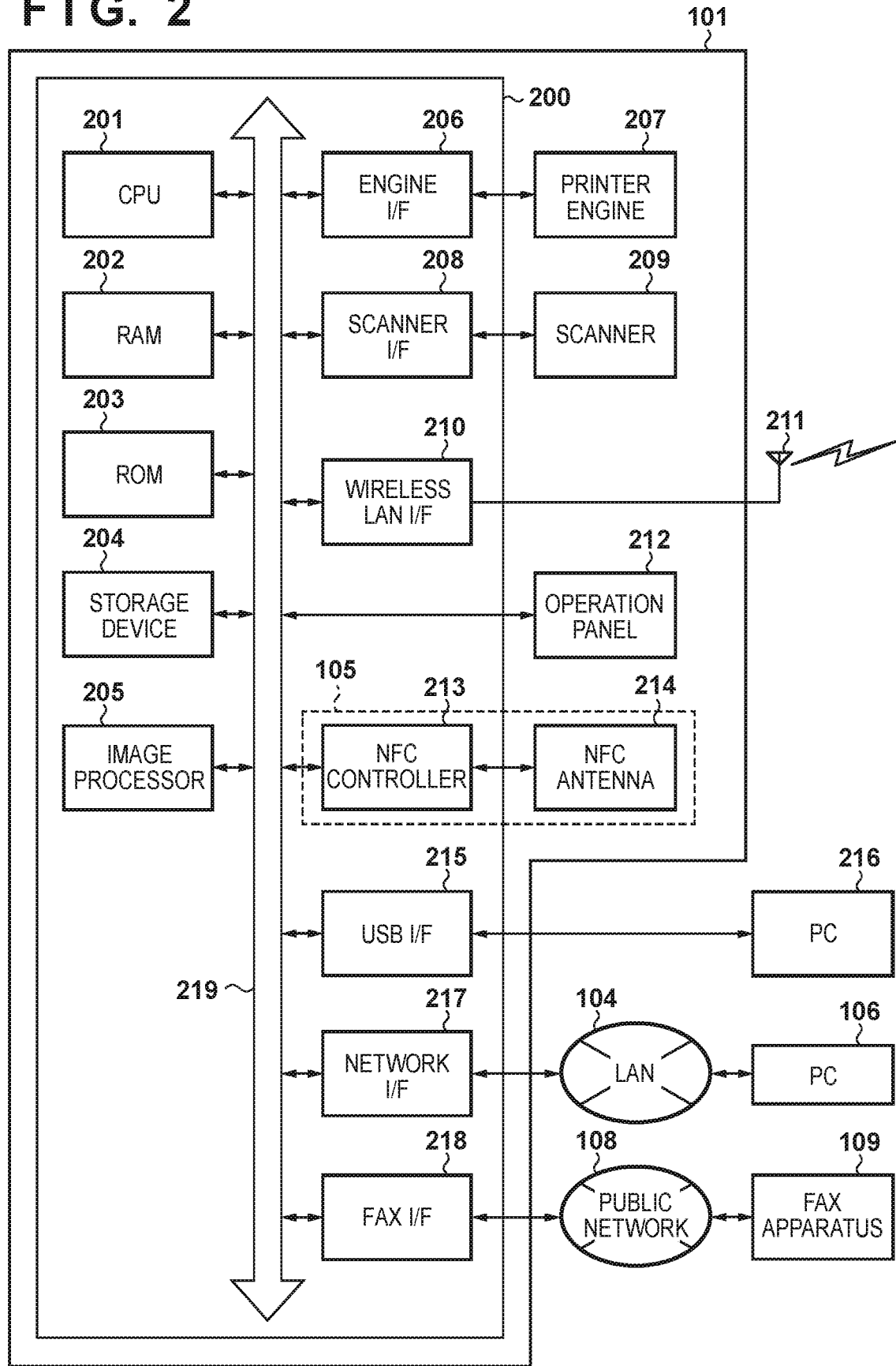
FIG. 2 is a block diagram showing an example of a hardware configuration of an MFP.

FIG. 2 is a block diagram showing an example of a hardware configuration of the MFP 101 according to the present embodiment. The MFP 101 includes a controller board 200, and a scanner 209, a printer engine 207, an operation panel 212 and an NFC antenna 214 that are connected to the controller board 200. The controller board 200 implements various functions such as print, scan, copy and facsimile (FAX) in the MFP 101 by controlling the devices connected to the controller board 200.

The scanner 209 outputs image data obtained by reading an original image placed on the platen glass. The printer engine 207 prints (image forming) an image on paper based on the input image data (print data). The operation panel 212 includes a display unit such as a liquid crystal display unit and an operation unit including a hard keypad, a touch panel on the display unit and the like. The user can make various settings and issue various instructions with respect to the MFP 101 by using the operation panel 212. The MFP 101 is capable of displaying various types of information to the user via the operation panel 212.

The controller board 200 includes, as devices connected to a system bus 219, a CPU 201, a RAM 202, a ROM 203, a storage device 204, an image processor 205, an engine I/F 206, a scanner I/F 208, a wireless LAN I/F 210, an NFC controller 213, an USB I/F 215, a network I/F 217, and a FAX I/F 218. The NFC controller 213 is connected to the antenna for NFC (NFC antenna) 214, and constitutes the NFC tag 105 together with the NFC antenna 214.

The CPU 201 performs overall control on the MFP 101 by controlling the devices connected via the system bus 219. The RAM 202 is a system work memory for the CPU 201 to perform operations, and computation data and various programs used by the CPU 201 are stored therein. The RAM 202 is also used as an image memory for storing image data that has undergone various types of image processing operations performed by the image processor 205 during printing and scanning. The ROM 203 is a boot ROM, and a boot program for booting the MFP 101 is stored therein. The storage device 204 is a non-volatile storage device used to store programs and data. The CPU 201 uses the programs and data stored in the storage device 204 as needed by reading into the RAM 202.

The USB I/F 215 is locally connected to a PC 216, and is thus capable of direct communication with the PC 216. The network I/F 217 is connected to the LAN 104, and is thus capable of communication with the PC 106 connected to the LAN 104. The FAX I/F 218 is connected to a public network 108, and is thus capable of performing FAX communication with a FAX apparatus 109 connected to the public network 108.

The CPU 201 performs data communication with the printer engine 207 via the engine I/F 206, and performs data communication with the scanner 209 via the scanner I/F 208. Also, the CPU 201 performs data communication with the operation panel 212 via the system bus 219. The CPU 201 is also capable of communication with the PC 216 via the USB I/F 215, with the PC 106 via the network I/F 217, and with the FAX apparatus 109 via the FAX I/F 218.

The wireless LAN I/F 210 is connected to a wireless LAN (WLAN) antenna 211. The wireless LAN I/F 210 performs communication using a wireless LAN scheme or the Wi-Fi Direct via the antenna 211. For example, the wireless LAN I/F 210 is capable of performing, via the antenna 211, communication using a wireless LAN scheme with an access point, or direct communication using the Wi-Fi Direct (Wi-Fi Direct communication) with an external apparatus such as the mobile terminal 102. The CPU 201 is capable of communication with an external apparatus such as the mobile terminal 102 via the wireless LAN I/F 210.

The NFC controller 213 performs NFC communication with an external apparatus that is compliant with the NFC such as the mobile terminal 102 via the NFC antenna 214. The CPU 201 is capable of communication using the NFC with an external apparatus that is compliant with the NFC such as the mobile terminal 102 via the NFC controller 213 and the NFC antenna 214. In the present embodiment, the NFC controller 213 functions as an example of a first communication unit, and the CPU 201 and the wireless LAN I/F 210 function as an example of a second communication unit.

Configuration of Mobile Terminal

Figure 3:
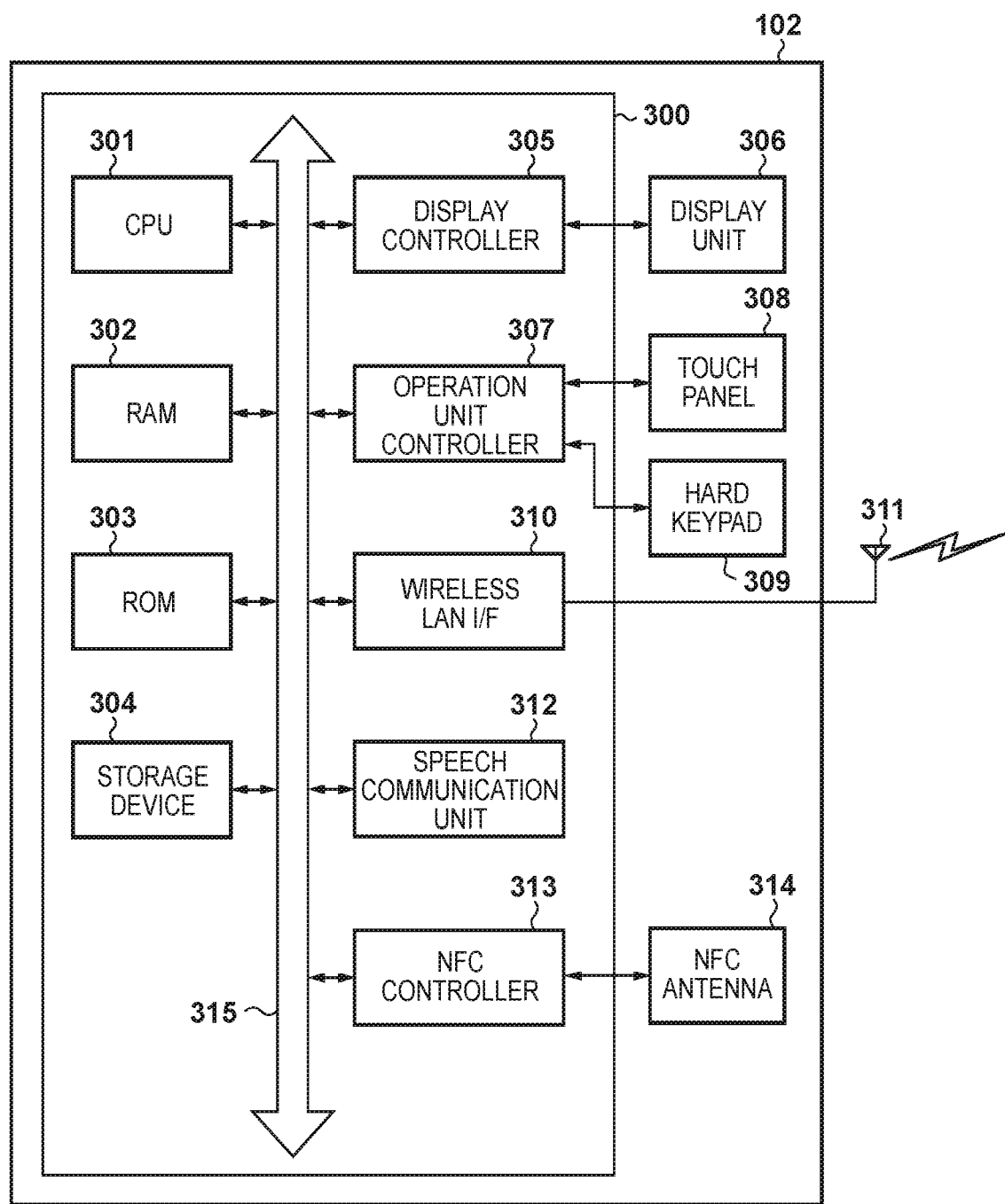
FIG. 3 is a block diagram showing an example of a hardware configuration of a mobile terminal.

FIG. 3 is a block diagram showing an example of a hardware configuration of the mobile terminal 102. The mobile terminal 102 includes a controller board 300, and a display unit 306, a touch panel 308, a hard keypad 309, and an NFC antenna 314 that are connected to the controller board 300. The controller board 300 implements various functions in the mobile terminal 102 by controlling the devices connected to the controller board 300. The controller board 300 includes a CPU 301, a RAM 302, a ROM 303, a storage device 304, a display controller 305, an operation unit controller 307, a wireless LAN I/F 310, a speech communication unit 312, and an NFC controller 313.

The CPU 301 performs overall control on the mobile terminal 102 by controlling the devices connected via a system bus 315. The RAM 302 is a system work memory for the CPU 301 to perform operations, and computation data and various programs used by the CPU 301 are stored therein. The ROM 303 is a boot ROM, and a boot program for booting the mobile terminal 102 is stored therein. The storage device 304 is a non-volatile storage device used to store programs and data. The CPU 301 uses the programs and data stored in the storage device 304 as needed by reading into the RAM 302.

The display controller 305 controls display on the display unit 306 in response to an instruction from the CPU 301. The operation unit controller 307 controls the touch panel 308 and the hard keypad 309, and transmits signals indicating the content of user operations on the touch panel 308 and the hard keypad 309 to the CPU 301 via the system bus 315. The speech communication unit 312 is connected to a microphone and a speaker (not shown), and provides a telephone function of the mobile terminal 102 by performing communication with a base station of a mobile network such as the 3G network or the LTE network.

The wireless LAN I/F 310 is connected to a WLAN antenna 311. The wireless LAN I/F 310 performs, via the antenna 311, communication using a wireless LAN scheme or the Wi-Fi Direct. For example, the wireless LAN I/F 310 is capable of performing communication using a wireless LAN scheme with an access point or Wi-Fi Direct communication with an external apparatus such as the MFP 101 via the antenna 311. The CPU 301 is capable of communication with an external apparatus such as the MFP 101 via the wireless LAN I/F 310.

The NFC controller 313 performs NFC communication with an external apparatus that is compliant with the NFC such as the MFP 101 via the NFC antenna 314. The CPU 301 is capable of communication using the NFC with an external apparatus that is compliant with the NFC such as the MFP 101 via the NFC controller 313 and the NFC antenna 314.

Control for Obtaining Data by Mobile Terminal

Figure 4:
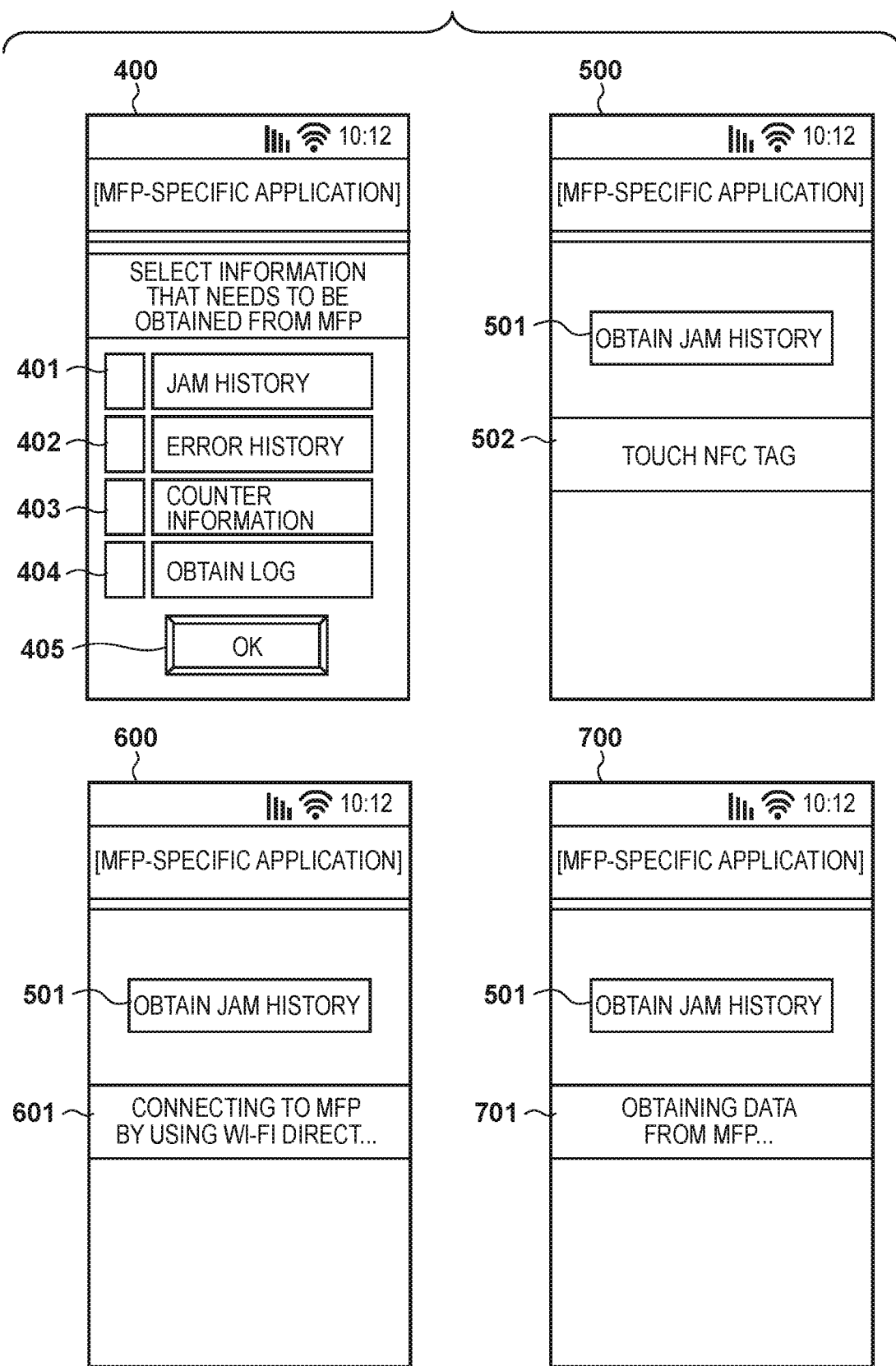
FIG. 4 is a diagram showing examples of operation screens of an MFP-specific application, which are displayed on a display unit of the mobile terminal.
Figure 5:
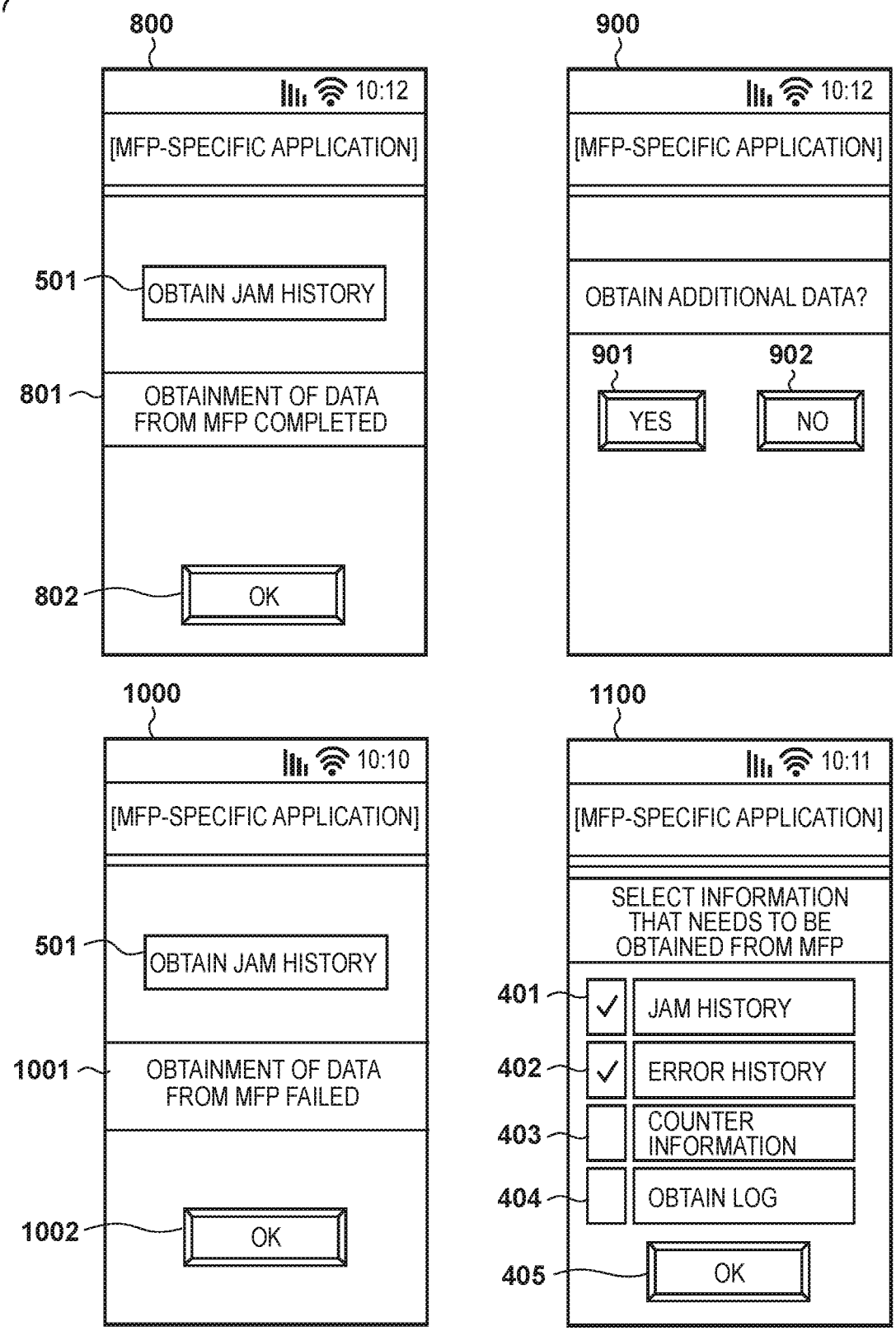
FIG. 5 is a diagram showing examples of operation screens of the MFP-specific application, which are displayed on the display unit of the mobile terminal.
Figure 6:
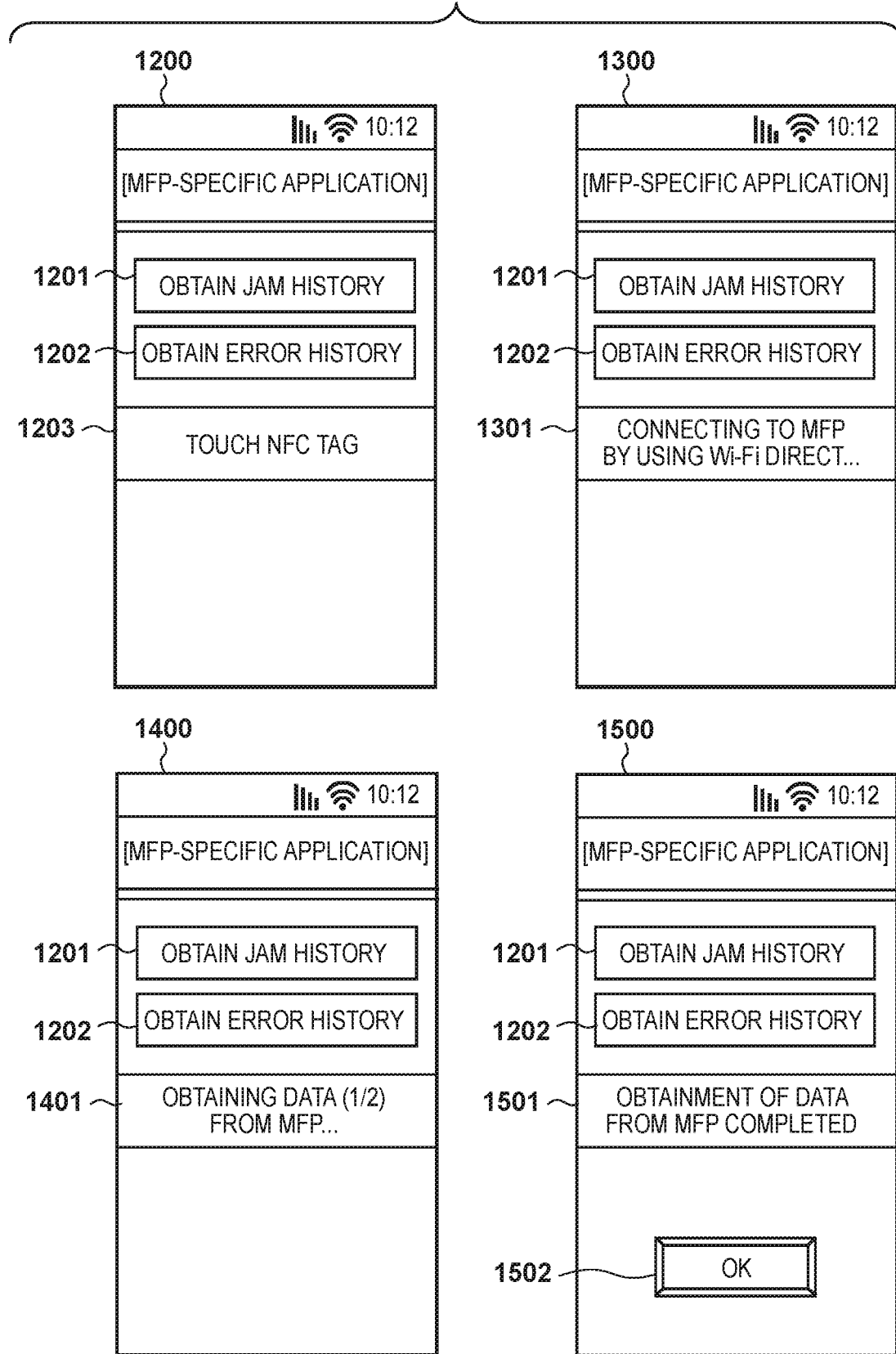
FIG. 6 is a diagram showing examples of operation screens of the MFP-specific application, which are displayed on the display unit of the mobile terminal.

In the present embodiment, the mobile terminal 102 provides a user interface (UI) for the user to designate at least one data item that needs to be obtained from the MFP 101. To be specific, the CPU 301 displays operation screens as shown in FIGS. 4 to 6 on the display unit 306 by executing an MFP-specific application described below. Through this, the CPU 301 enables the user to designate a data item by using the touch panel 308. The CPU 301 designates at least one data item that needs to be obtained from the MFP 101 according to the designation made by the user using the touch panel 308.

After that, in response to the user bringing the mobile terminal 102 closer to the MFP 101 (the NFC tag 105) so as to cause the mobile terminal 102 and the MFP 101 (the NFC tag 105) to be proximate to each other, the NFC controller 313 establishes NFC communication with the NFC tag 105. The CPU 301 thereby obtains, through the NFC communication, connection information (SSID, encryption key and the like of the MFP 101) for establishing a Wi-Fi Direct connection to the MFP 101. Furthermore, the CPU 301 connects to the MFP 101 by using the Wi-Fi Direct based on the obtained connection information so as to obtain data corresponding to the data item designated by the user instruction from the MFP 101 through the Wi-Fi Direct communication.

In this way, the present embodiment enables data designated by the user in the mobile terminal 102 to be obtained from the MFP 101 through Wi-Fi Direct communication established based on NFC communication. With this configuration, it is possible to increase the degree of freedom in designating (selecting) data that can be obtained by the mobile terminal 102 from the MFP 101 through Wi-Fi Direct communication, and thus usability can be improved.

Example of Operation of MFP-Specific Application

An example of operation of the MFP-specific application running on the mobile terminal 102 and examples of operation screens of the application will be described next with reference to FIGS. 4 to 6. The user of the mobile terminal 102 can perform operations on a menu or buttons displayed on the display unit 306 (operations such as scrolling the menu, and pressing a button) by operating the touch panel 308.

Upon activation of the MFP-specific application by the user operating the touch panel 308 of the mobile terminal 102, an operation screen 400 (FIG. 4) is displayed on the display unit 306. To be specific, in response to a user operation, the CPU 301 reads out the MFP-specific application stored in the storage device 304 or the ROM 303 into the RAM 302 and executes the MFP-specific application so as to cause the MFP-specific application to run on the mobile terminal 102. Through this, the CPU 301 controls the display controller 305 so as to display the operation screen 400 on the display unit 306. As will be described below, the CPU 301 performs display control of the display unit 306 and control for obtaining data from the MFP 101 in response to a user operation performed on the touch panel 308.

The operation screen 400 (FIG. 4) is an example of an operation screen (top screen) displayed on the display unit 306 upon activation of the MFP-specific application. Data items 401 to 404 that are obtainable from the MFP 101 are displayed on the operation screen 400 such that they can be designated (selected) by an operation performed on the touch panel 308. The data items 401 to 404 shown in FIG. 4 are merely examples, and thus any type of information such as history information, settings information and address book information in the MFP 101 can be designated.

Case where One Data Item is Selected

If the user selects any one of the data items 401 to 404 and presses an OK button 405 while the operation screen 400 is displayed on the display unit 306, the display on the display unit 306 is switched from the operation screen 400 to an operation screen 500 (FIG. 4). On the operation screen 500, a data item 501 to be obtained, which was selected on the operation screen 400, and a message 502 prompting the user to bring the mobile terminal 102 closer to the NFC tag 105 (of the MFP 101) are displayed.

In response to the mobile terminal 102, with the operation screen 500 being displayed on the display unit 306, being brought within the communicable range of the NFC tag 105, NFC communication is established between the mobile terminal 102 and the NFC tag 105. The mobile terminal 102 thereby receives connection information for connecting to the MFP 101 using the Wi-Fi Direct from the NFC tag 105 through the NFC communication. After that, in response to the mobile terminal 102 starting a Wi-Fi Direct connection to the MFP 101 based on the received connection information, the display on the display unit 306 is switched to an operation screen 600 (FIG. 4). On the operation screen 600, a message 601 indicating that a Wi-Fi Direct connection to the MFP 101 is in progress is displayed.

Upon establishment of the Wi-Fi Direct connection between the mobile terminal 102 and the MFP 101, the mobile terminal 102 starts obtaining data from the MFP 101 through the Wi-Fi Direct communication. At this time, the display on the display unit 306 is switched to an operation screen 700 (FIG. 4). On the operation screen 700, a message 701 indicating that obtainment of data corresponding to the data item 501 to be obtained from the MFP 101 is in progress is displayed. Upon completion of obtaining the data from the MFP 101, the display on the display unit 306 is switched to an operation screen 800 (FIG. 5).

On the operation screen 800, a message 801 indicating that the obtainment of the data from the MFP 101 has been completed and an OK button 802 are displayed. In response to the user pressing the OK button 802 on the operation screen 800, the display on the display unit 306 is switched to an operation screen 900 (FIG. 5). The operation screen 900 is a screen provided for the user to select whether or not there is additional data that needs to be obtained from the MFP 101. If a YES button 901 is pressed by the user on the operation screen 900, the display on the display unit 306 is switched to the operation screen 400 (FIG. 4). If, on the other hand, a NO button 902 is pressed by the user, the mobile terminal 102 ends the execution of the MFP-specific application.

If, on the other hand, obtainment of the data from the MFP 101 fails, the display on the display unit 306 is switched from the operation screen 700 to an operation screen 1000 (FIG. 5). On the operation screen 1000, a message 1001 indicating that obtainment of the data from the MFP 101 has failed and an OK button 1002 are displayed. In response to the user pressing the OK button 1002 on the operation screen 1000, the display on the display unit 306 is switched to the operation screen 400 (FIG. 4).

Case where a Plurality of Data Items are Selected

An operation screen 1100 (FIG. 5) is an example of a screen displayed if the user selects a plurality of data items from among the data items 401 to 404 on the operation screen 400. In response to the user pressing the OK button 405 on the operation screen 1100, the display on the display unit 306 is switched to an operation screen 1200 (FIG. 6).

On the operation screen 1200, data items 1201 and 1202 to be obtained and a message 1203 prompting the user to bring the mobile terminal 102 closer to the NFC tag 105 (of the MFP 101) are displayed.

In response to the mobile terminal 102, with the operation screen 1200 being displayed on the display unit 306, being brought within the communicable range of the NFC tag 105, NFC communication is established between the mobile terminal 102 and the NFC tag 105. The mobile terminal 102 thereby receives connection information for connecting to the MFP 101 using the Wi-Fi Direct from the NFC tag 105 through the NFC communication. After that, in response to the mobile terminal 102 starting a Wi-Fi Direct connection to the MFP 101 based on the received connection information, the display on the display unit 306 is switched to an operation screen 1300 (FIG. 6). On the operation screen 1300, a message 1301 indicating that a Wi-Fi Direct connection to the MFP 101 is in progress is displayed.

Upon establishment of the Wi-Fi Direct connection between the mobile terminal 102 and the MFP 101, the mobile terminal 102 starts obtaining data from the MFP 101 through the Wi-Fi Direct communication. At this time, the display on the display unit 306 is switched to an operation screen 1400 (FIG. 6). On the operation screen 1400, a message 1401 indicating the status of obtaining data corresponding to the data items 1201 and 1202 to be obtained is displayed. Upon completion of obtaining the data from the MFP 101, the display on the display unit 306 is switched to an operation screen 1500 (FIG. 6).

On the operation screen 1500, a message 1501 indicating that obtainment of the data from the MFP 101 has been completed and an OK button 1502 are displayed. In response to the OK button 1502 being pressed on the operation screen 1500, the display on the display unit 306 is switched to the operation screen 900 (FIG. 5). If, on the other hand, obtainment of the data from the MFP 101 fails, the display on the display unit 306 is switched from the operation screen 1400 to the operation screen 1000 (FIG. 5).

Procedure for Performing Control for Obtaining Data

Figure 7:
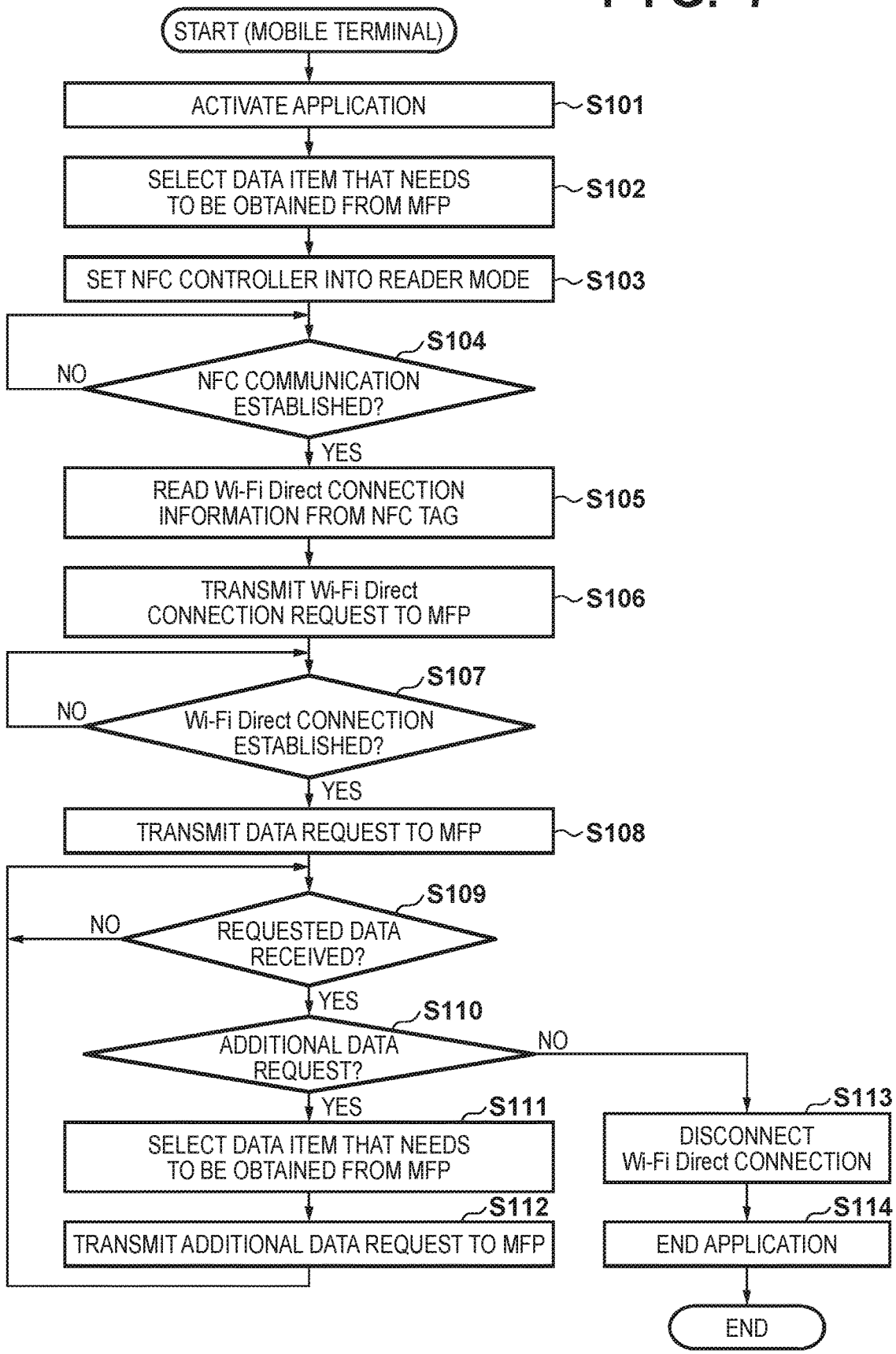
FIG. 7 is a flowchart illustrating a procedure for performing control for obtaining data executed by a mobile terminal 102 according to the first embodiment.
Figure 8:
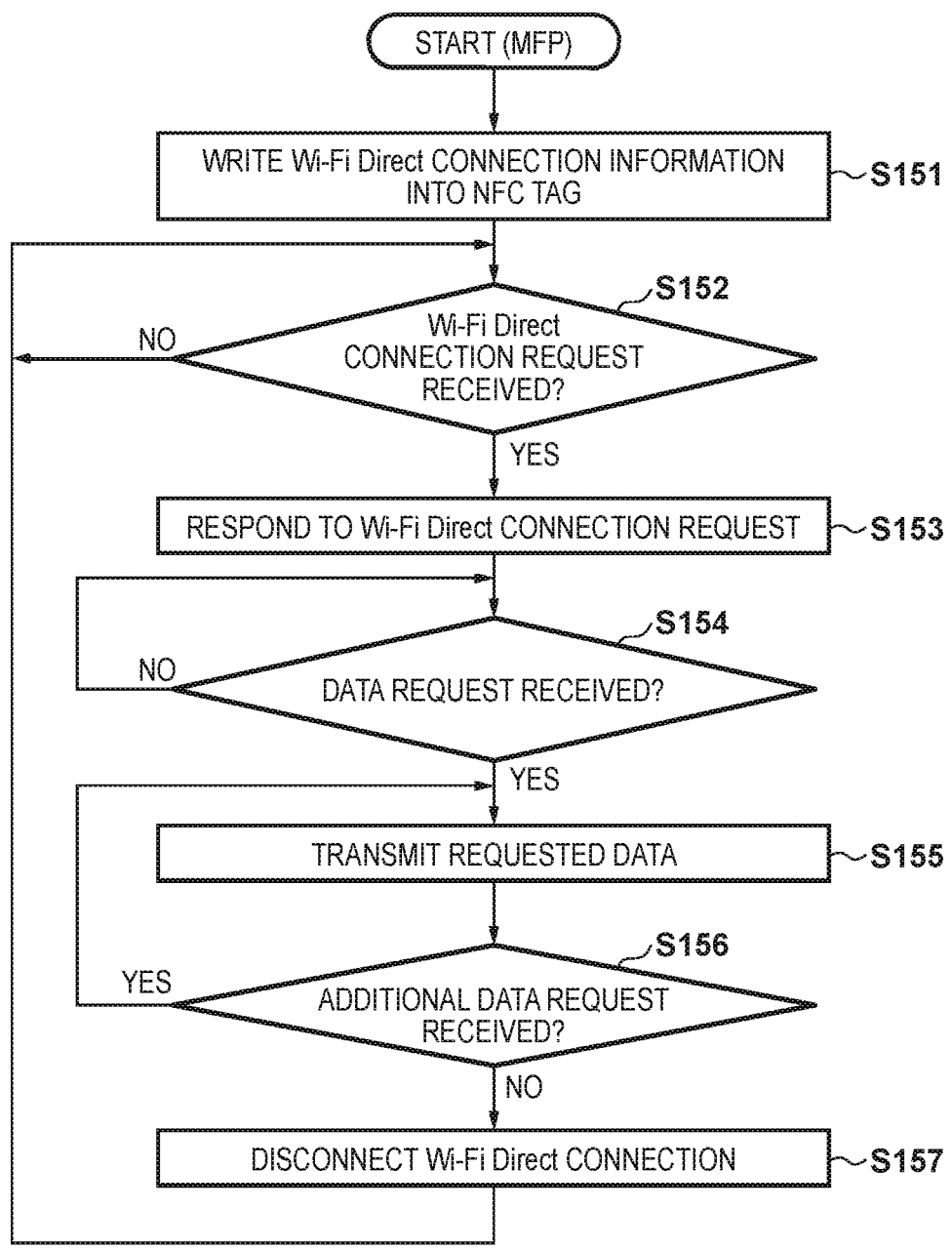
FIG. 8 is a flowchart illustrating a procedure for performing control for obtaining data executed by an MFP 101 according to the first embodiment.

FIGS. 7 and 8 are flowcharts illustrating a procedure for performing control for obtaining data executed by the mobile terminal 102 and the MFP 101 according to the present embodiment. The processing of steps shown in FIG. 7 is implemented in the mobile terminal 102 by the CPU 301 of the mobile terminal 102 reading out the MFP-specific application stored in the storage device 304 or the ROM 303 into the RAM 302 and executing the MFP-specific application. Likewise, the processing of steps shown in FIG. 8 is implemented in the MFP 101 by the CPU 201 of the MFP 101 reading out a control program stored in the storage device 204 or the ROM 203 into the RAM 202 and executing the control program. In the present embodiment, a case will be described where the mobile terminal 102 obtains data from the MFP 101, but the procedure shown in FIGS. 7 and 8 is also applicable to a case where data is obtained from an information processing apparatus such as a PC.

In the MFP 101, if the main power supply is turned on, first, in step S151, the CPU 201 writes connection information (Wi-Fi Direct connection information) for connecting to the MFP 101 using the Wi-Fi Direct into the NFC tag 105. The connection information includes, as described above, the SSID, encryption key and the like of the MFP 101. The NFC tag 105 includes a storage area where reading and writing of information from an external apparatus can be performed through NFC communication, and the CPU 201 stores the Wi-Fi Direct connection information in the storage area. After that, in step S152, the CPU 201 waits for a Wi-Fi Direct connection request from an external apparatus.

On the other hand, in the mobile terminal 102, if the user issues an instruction to activate the MFP-specific application by operating the touch panel 308, in step S101, the CPU 301 activates the MFP-specific application. The CPU 301 reads out the MFP-specific application stored in the storage device 304 or the ROM 303 into the RAM 302 and starts execution of the MFP-specific application in order to activate the application. Through this, the operation screen 400 (FIG. 4) is displayed on the display unit 306.

If the user issues an instruction to select a data item(s) that needs to be obtained from the MFP 101 on the operation screen 400, then, in step S102, the CPU 301 selects (designates) the data item(s) that needs to be obtained from the MFP 101 according to the user instruction. After that, the CPU 301 advances the processing to step S103.

In the present embodiment, the mobile terminal 102 obtains the Wi-Fi Direct connection information from the MFP 101 by reading the Wi-Fi Direct connection information from (the storage area of) the NFC tag 105 by using an NFC reader function provided in the NFC controller 313. To be specific, in step S103, the CPU 301 sets the NFC controller 313 into a reader mode. The NFC controller 313 is configured to be capable of operating in three communication modes that are NFC communication modes: a writer mode (first communication mode); a reader mode (second communication mode); and a peer to peer (P2P) mode (third communication mode). The writer mode is a communication mode which allows only transmitting (writing) of data to an external apparatus. The reader mode is a communication mode which allows only receiving (reading) of data from an external apparatus. The P2P mode is a communication mode which allows transmitting and receiving (bidirectional communication) of data to and from an external apparatus.

Next, in step S104, the CPU 301 determines whether or not the NFC controller 313 has established NFC communication with the NFC tag 105 as a result of the mobile terminal 102 being brought closer to the NFC tag 105 of the MFP 101 by the user. If it is determined that NFC communication has been established ("YES" in step S104), next in step S105, the CPU 301 reads Wi-Fi Direct connection information from the NFC tag 105 through the NFC communication. Furthermore, in step S106, the CPU 301 transmits a Wi-Fi Direct connection request to the MFP 101 based on the connection information read from the NFC tag 105, and advances the processing to step S107.

In the MFP 101, in step S152, the CPU 201 determines whether or not a Wi-Fi Direct connection request has been received from an external apparatus. If it is determined that a Wi-Fi Direct connection request has been received from the mobile terminal 102 ("YES" in step S152), then in step S153, the CPU 201 transmits a response to the received connection request, and advances the processing to step S154. Through this, a Wi-Fi Direct connection is established between the mobile terminal 102 and the MFP 101, and Wi-Fi Direct communication becomes available.

In the mobile terminal 102, in step S107, the CPU 301 determines whether or not a Wi-Fi Direct connection has been established. Upon establishment of a Wi-Fi Direct connection as a result of receiving a response to the Wi-Fi Direct connection request from the MFP 101 ("YES" in step S107), the CPU 301 advances the processing to step S108. In step S108, the CPU 301 transmits a data request for requesting data corresponding to the data item(s) selected in step S102 to the MFP 101 through the Wi-Fi Direct communication, and advances the processing to step S109. If a plurality of data items are selected in step S102, the CPU 301 transmits a data request for requesting data corresponding to all of the data items selected.

In the MFP 101, in step S154, the CPU 201 determines whether or not a data request has been received from the mobile terminal 102. If it is determined that a data request has been received ("YES" in step S154), in step S155, the CPU 201 transmits data corresponding to the requested data item(s) to the mobile terminal 102 through the Wi-Fi Direct communication, according to the data request received from the mobile terminal 102. After that, the CPU 201 advances the processing to step S156. If data corresponding to a plurality of data items is requested, all of the requested data is transmitted to the mobile terminal 102.

In the mobile terminal 102, in step S109, the CPU 301 determines whether or not the data requested in step S108 has been received from the MFP 101, and advances the processing to step S110 if it is determined that the data has been received ("YES" in step S109). If reception of the data from the MFP 101 fails as a result of the Wi-Fi Direct connection being disconnected due to, for example, degradation of the communication state, the CPU 301 may display an operation screen such as the operation screen 1000 on the display unit 306, and end the processing of the flowchart shown in FIG. 7.

In step S110, the CPU 301 determines whether or not there is an additional data request. Here, if the button 901 is pressed on the operation screen 900, the CPU 301 determines that there is an additional data request ("YES" in step S110), and advances the processing to step S111. If, on the other hand, the button 902 is pressed on the operation screen 900, the CPU 301 determines that there is no additional data request ("NO" in step S110), and advances the processing to step S113.

In the case where additional data is to be obtained from the MFP 101 ("YES" in step S110), in step S111, by accepting selection (designation) of an additional data item from the user via the operation screen 400, the CPU 301 selects the additional data item. Furthermore, in step S112, the CPU 301 transmits a data request for requesting data corresponding to the data item selected in step S111 to the MFP 101 through the Wi-Fi Direct communication, and advances the processing to step S109. The CPU 301 thereby obtains the data corresponding to the additional data item from the MFP 101 through the Wi-Fi Direct communication.

On the other hand, in the case where additional data is not obtained from the MFP 101 ("NO" in step S110), in step S113, the CPU 301 disconnects the Wi-Fi Direct connection to the MFP 101, and then in step S114, ends the MFP-specific application. After that, the CPU 301 ends the processing of the flowchart shown in FIG. 7.

In the MFP 101, in step S156, the CPU 201 determines whether or not an additional data request has been received from the mobile terminal 102. If it is determined that an additional data request has been received ("YES" in step S156), the CPU 201 returns the processing to step S155. In step S155, the CPU 201 transmits data corresponding to the requested data item to the mobile terminal 102 through the Wi-Fi Direct communication, according to the data request received from the mobile terminal 102. If, on the other hand, it is determined that an additional data request has not been received ("NO" in step S156), the CPU 201 advances the processing from step S156 to step S157.

In step S157, the CPU 201 disconnects the Wi-Fi Direct connection to the mobile terminal 102, and returns the processing to step S152. In step S152, the CPU 201 again waits for a Wi-Fi Direct connection request from an external apparatus.

As described above, the present embodiment enables the data designated by the user in the mobile terminal 102 to be obtained from the MFP 101 through Wi-Fi Direct communication established based on NFC communication. This enables the user to freely designate data that needs to be obtained from the MFP 101 through the Wi-Fi Direct communication, and thus usability can be improved. In addition, in the present embodiment, Wi-Fi Direct connection information is stored in advance in the NFC tag 105 of the MFP 101, and thus the mobile terminal 102 can obtain the Wi-Fi Direct connection information from the NFC tag 105 through the NFC communication. With this configuration, establishment of a Wi-Fi Direct connection between the mobile terminal 102 and the MFP 101 and obtainment of data from the MFP 101 can be implemented by the user simply bringing the mobile terminal 102 closer to the MFP 101 (the NFC tag 105). Therefore, according to the present embodiment, it is possible to obtain data from the MFP 101 with a simple operation performed by the user.

The present embodiment has described a case where the mobile terminal 102 communicates directly with the MFP 101 by using the Wi-Fi Direct as high-speed wireless communication. However, the present embodiment is also applicable to a case where the mobile terminal 102 communicates with the MFP 101 via an access point using a WLAN scheme as the high-speed wireless communication instead of using the Wi-Fi Direct communication. In this case, the MFP 101 provides, as the connection information, information for connecting to the access point by using the WLAN scheme to the mobile terminal 102 through NFC communication. The mobile terminal 102 (the CPU 301) connects to the access point based on the connection information obtained from the MFP 101 through the NFC communication, so as to communicate with the MFP 101 via the access point, and obtains data from the MFP 101. In addition, the present embodiment is also applicable to a case where Bluetooth® communication is used as the high-speed wireless communication.

Second Embodiment

In the first embodiment, the mobile terminal 102 transmits a data request to the MFP 101 by using Wi-Fi Direct communication established based on the Wi-Fi Direct connection information read from the NFC tag 105 through NFC communication (step S108). In contrast, in the second embodiment, an example will be described in which the transmission of the data request is performed by using NFC communication before Wi-Fi Direct communication is established. In order to simplify the description, a description that overlaps with that of the first embodiment is omitted here.

Figure 9:
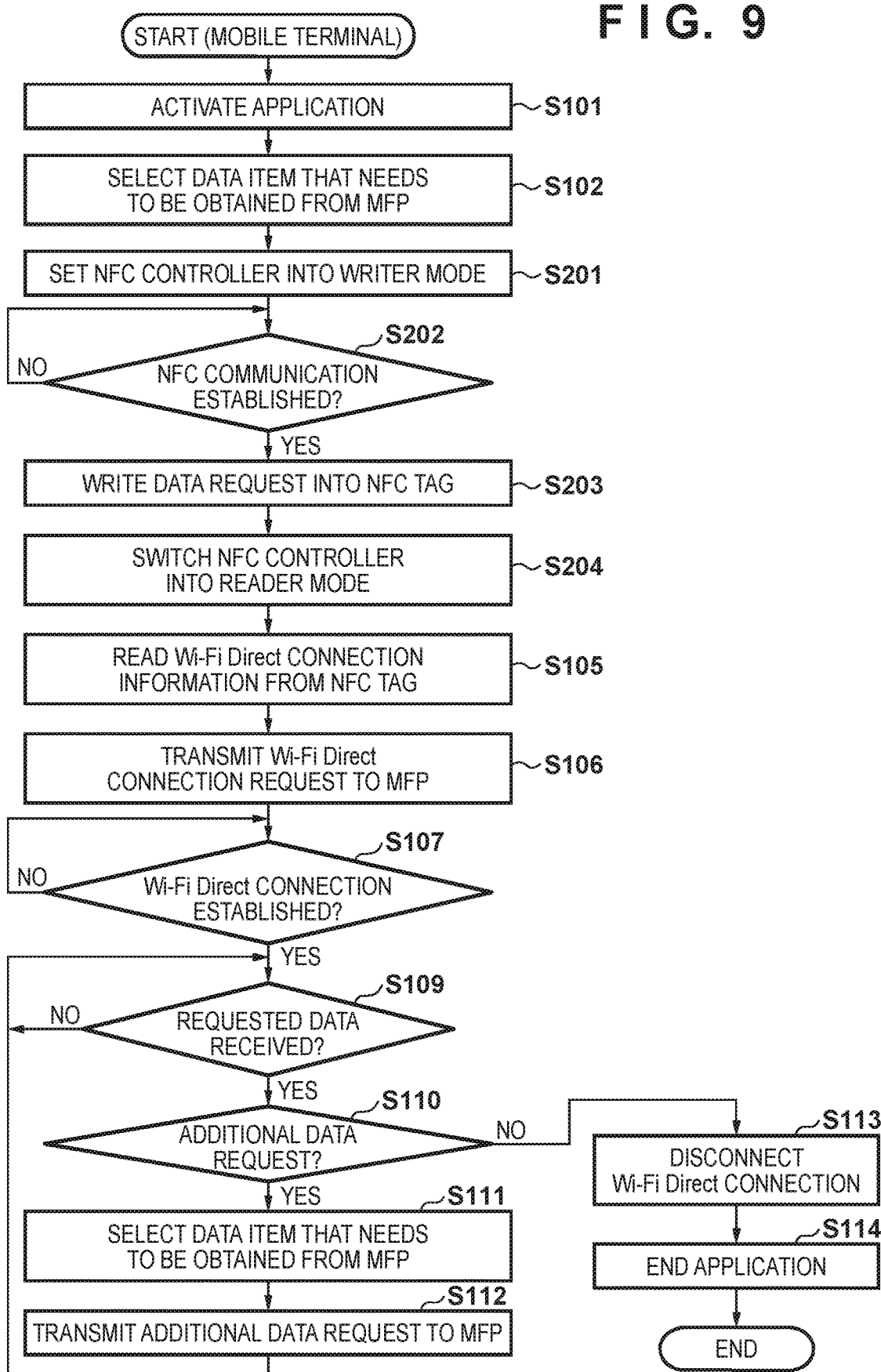
FIG. 9 is a flowchart illustrating a procedure for performing control for obtaining data executed by a mobile terminal 102 according to a second embodiment.
Figure 10:
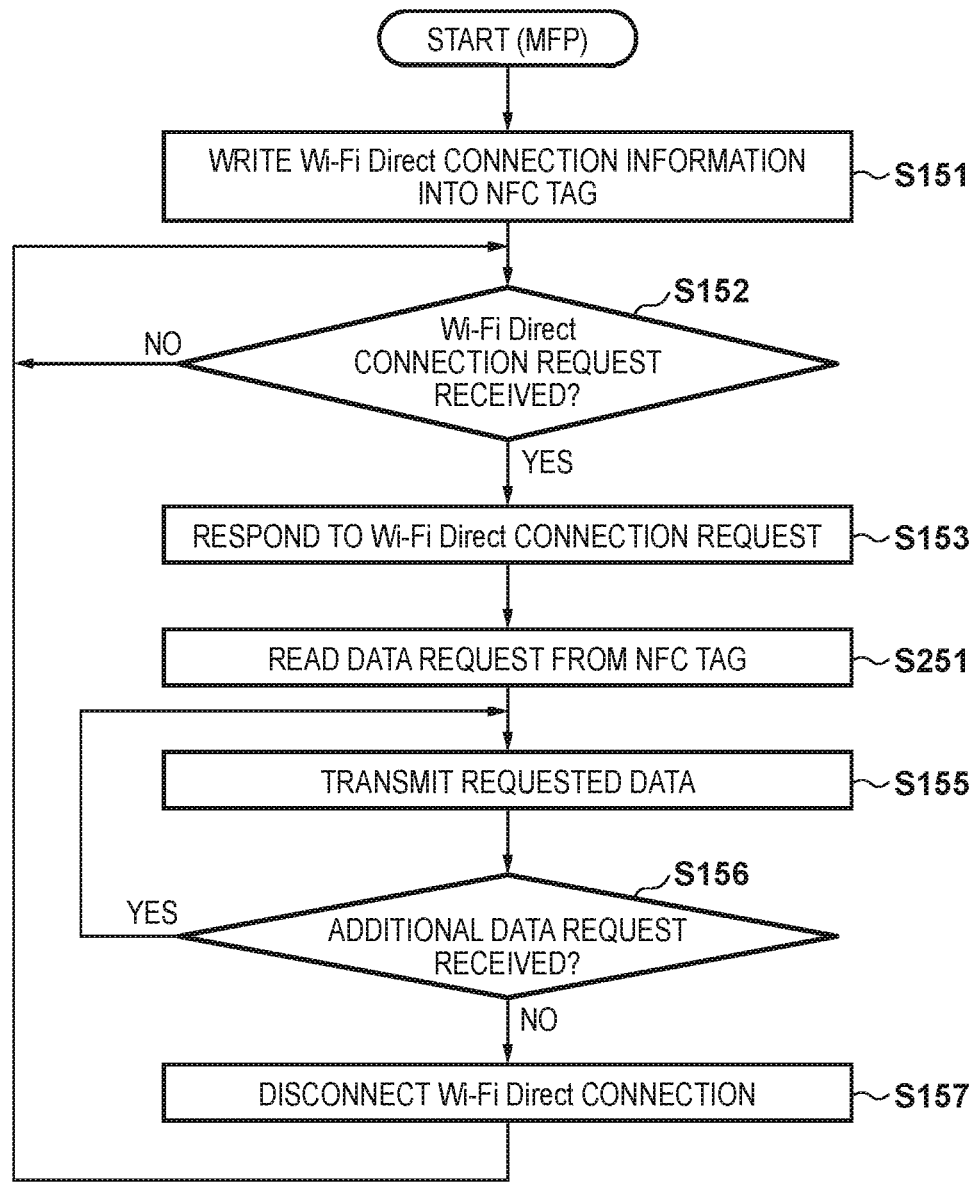
FIG. 10 is a flowchart illustrating a procedure for performing control for obtaining data executed by an MFP 101 according to the second embodiment.

FIGS. 9 and 10 are flowcharts illustrating a procedure for performing control for obtaining data executed by the mobile terminal 102 and the MFP 101 according to the present embodiment. The processing of steps shown in FIG. 9 is implemented in the mobile terminal 102 by the CPU 301 of the mobile terminal 102 reading out the MFP-specific application stored in the storage device 304 or the ROM 303 into the RAM 302 and executing the MFP-specific application. Likewise, the processing of steps shown in FIG. 10 is implemented in the MFP 101 by the CPU 201 of the MFP 101 reading out a control program stored in the storage device 204 or the ROM 203 into the RAM 202 and executing the control program. In the present embodiment, as in the first embodiment, a case will be described where the mobile terminal 102 obtains data from the MFP 101, but the procedure shown in FIGS. 9 and 10 is also applicable to a case where data is obtained from an information processing apparatus such as a PC.

In FIGS. 9 and 10, steps in which the same processing as those of the first embodiment is performed are given the same reference numerals as in FIGS. 7 and 8. FIG. 9 is different from that of the first embodiment (FIG. 7) in that steps S103 and S104 are replaced by steps S201 to S204, and that step S108 is removed. Likewise, FIG. 10 is different from that of the first embodiment (FIG. 8) in that step S154 is replaced by step S251.

To be more specific, in the mobile terminal 102, as in the first embodiment, the CPU 301 selects (designates) a data item(s) that needs to be obtained from the MFP 101 in step S102, and thereafter advances the processing to step S201. In the present embodiment, the mobile terminal 102 writes a data request for requesting data corresponding to the selected data item(s) into the NFC tag 105 of the MFP 101 by using an NFC writer function provided in the NFC controller 313. The mobile terminal 102 thereby issues the data request to the MFP 101.

In step S201, the CPU 301 sets the NFC controller 313 into a writer mode. As described above, the writer mode is a communication mode which allows only transmitting (writing) of data to an external apparatus. Next, in step S202, the CPU 301 determines whether or not the NFC controller 313 has established NFC communication with the NFC tag 105 as a result of the mobile terminal 102 being brought closer to the NFC tag 105 of the MFP 101 by the user. If it is determined that NFC communication has been established ("YES" in step S202), next in step S203, the CPU 301 writes the data request for requesting data corresponding to the data item(s) selected in step S102 into (the storage area of) the NFC tag 105 through the NFC communication.

After that, in step S204, the CPU 301 switches the NFC controller 313 into a reader mode so as to read the Wi-Fi Direct connection information from the NFC tag 105 through the NFC communication (step S105) as in the first embodiment. In the present embodiment, if a Wi-Fi Direct connection has been established with the MFP 101 based on the Wi-Fi Direct connection information read from the NFC tag 105 ("YES" in step S107), the CPU 301 advances the processing to step S109. That is, because the data request has already been transmitted to the MFP 101 (the data request has already been written into the NFC tag 105) through the NFC communication, the CPU 301 does not perform transmission of the initial data request through the Wi-Fi Direct communication.

After step S109, as in the first embodiment, the mobile terminal 102 obtains data corresponding to the data request from the MFP 101, and optionally transmits an additional data request to the MFP 101 so as to obtain additional data from the MFP 101.

On the other hand, in the MFP 101, if a Wi-Fi Direct connection to the mobile terminal 102 has been established, and Wi-Fi Direct communication becomes available (step S153), the CPU 201 advances the processing from step S153 to step S251. In step S251, the CPU 201 reads the data request written into (the storage area of) the NFC tag 105 by the mobile terminal 102 from (the storage area of) the NFC tag 105, instead of receiving a data request from the mobile terminal 102 through the Wi-Fi Direct communication. Furthermore, in step S155, the CPU 201 transmits data corresponding to the requested data item(s) to the mobile terminal 102 through the Wi-Fi Direct communication according to the data request, and advances the processing to step S156.

After step S156, as in the first embodiment, additional data is optionally transmitted to the MFP 101 through the Wi-Fi Direct communication according to an additional data request from the mobile terminal 102.

As described above, in the present embodiment, transmission of a data request from the mobile terminal 102 to the MFP 101 is performed before Wi-Fi Direct communication is established by writing the data request into the NFC tag 105 by using the NFC writer function. With this configuration, the MFP 101 can obtain the data request from the NFC tag 105 without having to wait for the data request to be received through the Wi-Fi Direct communication. Accordingly, in the MFP 101, it is possible to advance the start timing of transmitting data corresponding to the initial data request.

Third Embodiment

In a third embodiment, as a variation of the second embodiment, an example will be described in which transmission of a data request from the mobile terminal 102 to the MFP 101 is performed by using an NFC P2P function instead of using the NFC writer function. Also, in the present embodiment, the Wi-Fi Direct connection information is also transmitted from the MFP 101 to the mobile terminal 102 by using the NFC P2P function. In order to simplify the description, a description that overlaps with those of the first and second embodiments is omitted here.

Figure 11:
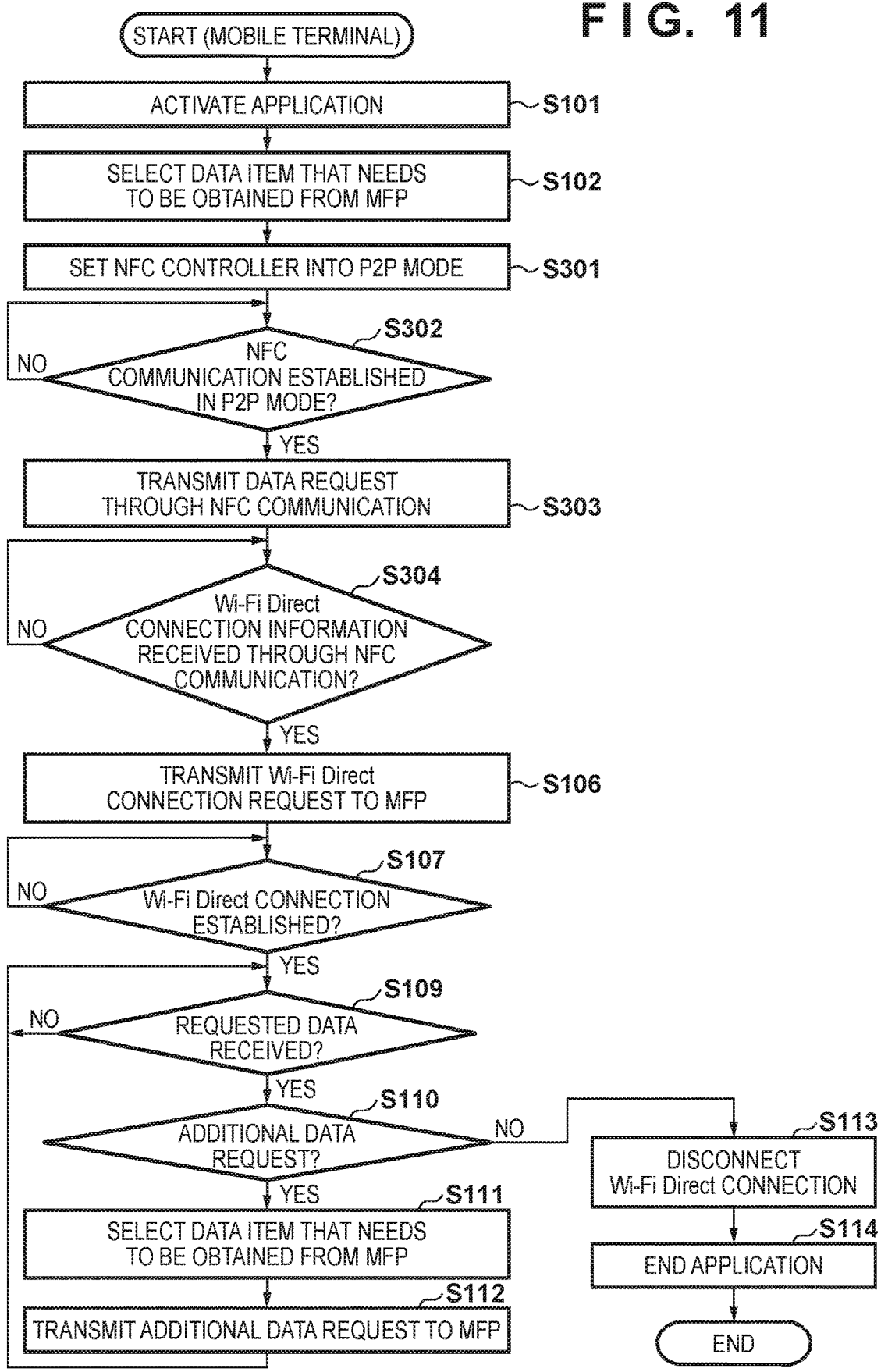
FIG. 11 is a flowchart illustrating a procedure for performing control for obtaining data executed by a mobile terminal 102 according to a third embodiment.

FIGS. 11 and 12 are flowcharts illustrating a procedure for performing control for obtaining data executed by the mobile terminal 102 and the MFP 101 according to the present embodiment. The processing of steps shown in FIG. 11 is implemented in the mobile terminal 102 by the CPU 301 of the mobile terminal 102 reading out the MFP-specific application stored in the storage device 304 or the ROM 303 into the RAM 302 and executing the MFP-specific application. Likewise, the processing of steps shown in FIG. 12 is implemented in the MFP 101 by the CPU 201 of the MFP 101 reading out a control program stored in the storage device 204 or the ROM 203 into the RAM 202 and executing the control program. In the present embodiment, as in the first embodiment, a case will be described where the mobile terminal 102 obtains data from the MFP 101, but the procedure shown in FIGS. 11 and 12 is also applicable to a case where data is obtained from an information processing apparatus such as a PC.

In FIGS. 11 and 12, steps that perform the same processing as those of the first embodiment are given the same reference numerals as in FIGS. 7 and 8. FIG. 11 is different from that of first embodiment (FIG. 7) in that steps S103 to S105 are replaced by steps S301 to S304, and that step S108 is removed. Likewise, FIG. 12 is different from that of the first embodiment (FIG. 8) in that step S151 is replaced by steps S351 to S353, and that step S154 is removed.

To be more specific, as in the first embodiment, in step S102, the CPU 301 selects (designates) a data item(s) that needs to be obtained from the MFP 101, and thereafter advances the processing to step S301. The mobile terminal 102 transmits a data request for requesting data corresponding to the selected data item(s) to the MFP 101 by using the NFC P2P function provided in the NFC controller 313. The mobile terminal 102 thereby issues a data request to the MFP 101. Furthermore, the mobile terminal 102 obtains the Wi-Fi Direct connection information from the MFP 101 by using the P2P function.

In step S301, the CPU 301 sets the NFC controller 313 into a P2P mode. As described above, the P2P mode is a communication mode which allows transmitting and receiving (bidirectional communication) of data to and from an external apparatus. Next, in step S302, the CPU 301 determines whether or not the NFC controller 313 has established NFC communication with the NFC tag 105 in the P2P mode as a result of the mobile terminal 102 being brought closer to the NFC tag 105 of the MFP 101 by the user. If it is determined that NFC communication has been established in the P2P mode ("YES" in step S302), the CPU 301 advances the processing to step S303.

NFC communication is established in the P2P mode as a result of the mobile terminal 102 transmitting a request for switching the NFC tag 105 (the NFC controller 213) into the P2P mode to the MFP 101 and receiving a response to the request from the MFP 101. The MFP 101 switches the NFC tag 105 into the P2P mode according to the request received from the mobile terminal 102.

In step S303, the CPU 301 transmits a data request for requesting data corresponding to the data item(s) selected in step S102 to the MFP 101 through the NFC communication. Furthermore, in step S304, the CPU 301 determines whether or not the Wi-Fi Direct connection information has been received from the MFP 101 through the NFC communication. If it is determined that the Wi-Fi Direct connection information has been received ("YES" in step S304), the CPU 301 advances the processing to step S106. The processing after step S106 is the same as that described in the second embodiment (FIG. 9).

On the other hand, in the MFP 101, in response to receiving a request for switching the NFC tag 105 into the P2P mode from the mobile terminal 102, the CPU 201 switches the NFC tag 105 into the P2P mode, and establishes NFC communication with the mobile terminal 102 in the P2P mode. In step S351, the MFP 101 determines whether or not the NFC tag 105 (the NFC controller 213) has established NFC communication with the NFC controller 313 in the P2P mode. If it is determined that NFC communication has been established in the P2P mode ("YES" in step S351), the CPU 201 advances the processing to step S352.

In step S352, the CPU 201 determines whether or not a data request has been received from the mobile terminal 102 through the NFC communication. If it is determined that a data request has been received ("YES" in step S352), in step S353, the CPU 201 transmits the Wi-Fi Direct connection information to the mobile terminal 102 through the NFC communication. Through this, the mobile terminal 102 establishes Wi-Fi Direct communication with the MFP 101 based on the Wi-Fi Direct connection information received through the NFC communication (step S107, step S153). Furthermore, the mobile terminal 102 obtains data corresponding to the data request received in step S352 from the MFP 101 through the Wi-Fi Direct communication (step S109, step S155). Accordingly, in the present embodiment, after step S153, the CPU 201 of the MFP 101 advances the processing to step S155, and thus does not perform reception of the initial data request through the Wi-Fi Direct communication.

After step S156, as in the first embodiment, additional data is optionally transmitted to the MFP 101 through the Wi-Fi Direct communication according to an additional data request from the mobile terminal 102. If the Wi-Fi Direct connection to the mobile terminal 102 is disconnected in step S157, the CPU 201 returns the processing to step S351.

As described above, in the present embodiment, transmission of a data request from the mobile terminal 102 to the MFP 101 is performed before Wi-Fi Direct communication is established by transmitting the data request to the NFC tag 105 by using the NFC P2P function. With this configuration, the MFP 101 can obtain the data request from the NFC tag 105 without having to wait for the data request to be received through the Wi-Fi Direct communication. Accordingly, as in the second embodiment, in the MFP 101, it is possible to advance the start timing of transmitting data corresponding to the initial data request.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-117093, filed Jun. 5, 2014, which is hereby incorporated by reference herein in its entirety.

What is claimed is:

1. A communication apparatus that can communicate with a printing apparatus, the communication apparatus comprising:
 a display device configured to display information;
 a wireless LAN interface configured to perform wireless communication;
 a wireless communicator capable of direct communicating with the printing apparatus; and
 one or more controllers configured to function as:
  a unit configured to cause the display device to display a first screen on which a plurality of selectable objects, respectively corresponding to a plurality of processing items that cooperate with the printing apparatus via the wireless LAN interface, are arranged;

a unit configured to cause, in a case where a first object is selected in a state that a communication relationship with the printing apparatus via the wireless LAN interface has not been established, the display device to display a second screen for notifying a user to perform an operation for bringing the communication apparatus close to the printing apparatus, acquire connection information for the communication relationship via the wireless communicator by the operation for bringing the communication apparatus close to the printing apparatus being performed, establish the communication relationship based on the acquired connection information, and cause the display device to display a third screen for notifying the user of acquisition of information corresponding to the selected first object; and a unit configured to, after the third screen is displayed and without the operation for bringing the communication apparatus close to the printing apparatus being performed, newly accept a selection of a second object for acquiring information of the printing apparatus and cause the display device to display a fourth screen for notifying the user of the acquisition of information corresponding to the selected second object.

2. The communication apparatus according to claim 1, wherein the second screen includes information indicating the first object being designated.

3. The communication apparatus according to claim 1, wherein the one or more controllers are further configured to function as:

a unit configured to cause the display device to display a screen which indicates that communication via the communication relationship is in progress after the connection information is acquired until the information corresponding to the selected first object is acquired.

4. The communication apparatus according to claim 1, wherein the one or more controllers are further configured to function as:

a unit configured to cause the display device to display an error screen in a case where the information corresponding to the selected first object cannot be acquired from the printing apparatus after the connection information is acquired.

5. The communication apparatus according to claim 1, wherein the one or more controllers are further configured to function as:

a unit configured to disconnect the communication relationship in a case where an instruction to further acquire information from the printing apparatus is not accepted after the information corresponding to the selected first object is acquired.

6. The communication apparatus according to claim 1, wherein the wireless communicator is compliant with NFC (Near Field Communication) standard.

7. The communication apparatus according to claim 1, wherein the communication relationship is a Wi-Fi Direct connection.

8. The communication apparatus according to claim 1, wherein the communication relationship is a connection for communicating with the printing apparatus via an access point.

9. The communication apparatus according to claim 1, wherein the first object corresponds to information relating to the printing apparatus.

10. The communication apparatus according to claim 1, wherein each of the third screen and fourth screen includes a notification and the acquisition result.

11. A communication method for controlling a communication apparatus having a display device configured to display information, a wireless LAN interface configured to perform wireless communication, and a wireless communicator capable of directly communicating with a printing apparatus, the method comprising:

causing a display device of a communication apparatus to display a first screen on which a plurality of selectable objects, respectively corresponding to a plurality processing items that cooperate with the printing apparatus via the wireless LAN interface, are arranged;

causing, in a case where a first object is selected in a state that a communication relationship with the printing apparatus via the wireless LAN interface has not been established, the display device to display a second screen for notifying a user to perform an operation for bringing the communication apparatus close to the printing apparatus, acquiring connection information for the communication relationship via the wireless communicator by the operation for bringing the communication apparatus close to the printing apparatus being performed, establishing the communication relationship based on the acquired connection information, and causing the display device to display a third screen for notifying the user of acquisition of information corresponding to the selected first object; and after the third screen is displayed and without the operation for bringing the communication apparatus close to the printing apparatus being performed, newly accepting a selection of a second object for acquiring information of the printing apparatus and causing the display device to display a fourth screen for notifying the user of acquisition of information corresponding to the selected second object.

12. The communication method according to claim 11, wherein each of the third screen and fourth screen includes a notification and the acquisition result.

13. A non-transitory computer-readable storage medium that stores a program to cause a computer to perform a method for controlling a communication apparatus having a display device configured to display information, a wireless LAN interface configured to perform wireless communication, and a wireless communicator capable of directly communicating with a printing apparatus, the method comprising:

causing the display device to display a first screen on which a plurality of selectable objects, respectively corresponding to a plurality processing items that cooperate with the printing apparatus via the wireless LAN interface, are arranged;

causing, in a case where a first object is selected in a state that a communication relationship with the printing apparatus via the wireless LAN interface has not been established, the display device to display a second screen for notifying a user to perform an operation for bringing the communication apparatus close to the printing apparatus, acquiring connection information for the communication relationship via the wireless communicator by the operation for bringing the communication apparatus close to the printing apparatus being performed, establishing the communication relationship based on the acquired connection information, and causing the display device to display a third screen for notifying the user of acquisition of information corresponding to the selected first object; and after the third screen is displayed and without the operation for bringing the communication apparatus close to the printing apparatus being performed, newly accepting a selection of a second object for acquiring information of the printing apparatus and causing the display device to display a fourth screen for notifying the user of acquisition of information corresponding to the selected second object.

14. The non-transitory computer-readable storage medium according to claim 13, wherein the second screen includes information indicating the first object being designated.

15. The non-transitory computer-readable storage medium according to claim 13, wherein the method further comprises:

displaying a screen which indicates that communication via the communication relationship is in progress after the connection information is acquired until the information corresponding to the selected first object is acquired.

16. The non-transitory computer-readable storage medium according to claim 13, wherein the method further comprises:

displaying an error screen in a case where the information corresponding to the selected first object cannot be acquired from the printing apparatus after the connection information is acquired.

17. The non-transitory computer-readable storage medium according to claim 13, wherein the method further comprises:

disconnecting the communication relationship in a case where an instruction to further acquire information from the printing apparatus is not accepted after the information corresponding to the selected first object is acquired.

18. The non-transitory computer-readable storage medium according to claim 13, wherein the wireless communicator is compliant with NFC (Near Field Communication) standard.

19. The non-transitory computer-readable storage medium according to claim 13, wherein the communication relationship is a Wi-Fi Direct connection.

20. The non-transitory computer-readable storage medium according to claim 13, wherein the communication relationship is a connection for communicating with the printing apparatus via an access point.

21. The non-transitory computer-readable storage medium according to claim 13, wherein the first object corresponds to information relating to the printing apparatus.

22. The non-transitory computer-readable storage medium according to claim 13, wherein each of the third screen and fourth screen includes a notification and the acquisition result.

* * * * *